United States Patent [19]
Gmeiner et al.

[11] 3,831,220
[45] Aug. 27, 1974

[54] WINDSHIELD WIPER SYSTEM FOR VEHICLES

[75] Inventors: Günter Gmeiner; Erwin Kölle, both of Sindelfingen; Rudolf Binder, Schonaich, all of Germany

[73] Assignee: Daimler-Benz Aktiengesellschaft, Stuttgurt, Germany

[22] Filed: Mar. 28, 1973

[21] Appl. No.: 345,495

[30] Foreign Application Priority Data
Mar. 29, 1972  Germany............................ 2215307

[52] U.S. Cl............................ 15/250.21, 15/250.23
[51] Int. Cl. ................................................ B60s /26
[58] Field of Search....... 15/250.13, 250.21, 250.23, 15/250.30, 250.39

[56] References Cited
UNITED STATES PATENTS
1,660,971  2/1928  Lindner .......................... 15/250.23
2,629.891  3/1953  Greene ........................... 15/250.23

FOREIGN PATENTS OR APPLICATIONS
1,162,324  4/1958  France............................ 15/250.23

Primary Examiner—Peter Feldman
Attorney, Agent, or Firm—Craig & Antonelli

[57] ABSTRACT

A windshield wiper installation for vehicles, especially for motor vehicles, with a wiper arm adjustable in its effective length which is supported displaceable in its longitudinal axis within a guide member adapted to be set into to and fro pivot movement by the wiper motor; the guide member is rotatably connected with the vehicle while a toothed segment coaxial with the pivotal connection of the guide member is rigidly connected with the vehicle; two levers are thereby provided which are pivotally connected with each other at one end while the free end of one lever is pivotally secured at the wiper arm and the free end of the other lever is pivotally secured at the guide member and carries a pinion non-rotatably secured thereto which meshes with the toothed segment.

5 Claims, 3 Drawing Figures

PATENTED AUG 27 1974                         3,831,220
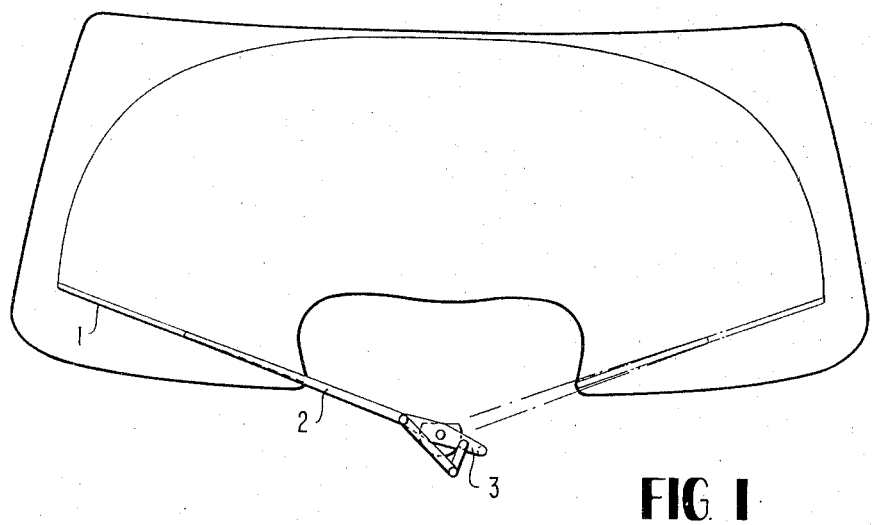
FIG. 1
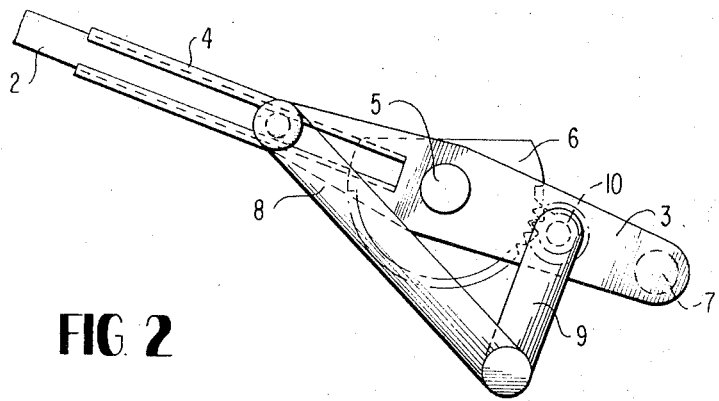
FIG. 2
FIG. 3
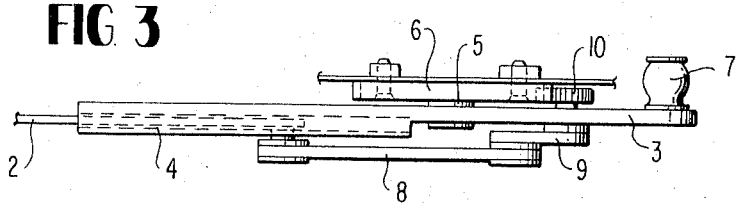

WINDSHIELD WIPER SYSTEM FOR VEHICLES

The present invention relates to a windshield wiping installation for vehicles, especially for motor vehicles, whose wiper arm is adjustable in its effective length.

The requirement for as large as possible a wiper field which offers optimum visibility conditions to the driver of a vehicle, cannot be fulfilled by the presently customary windshield wiper installations because in particular the upper corners of the windshield are generally not covered by the wiper blades.

Consequently, windshield wiper installations with wiper arms or wiper blades adjustable in the effective length thereof have already been proposed heretofore which, however, by reason of their complicated construction and their susceptibility to troubles and failures could not find acceptance in practice up to the present.

The present invention is therefore concerned with the task to provide a windshield wiper installation which offers to the driver, for example, of a motor vehicle optimum visibility conditions and is thereby constructed in a simple and operationally reliable manner.

As solution to the underlying problem, a windshield wiper installation for vehicles, especially for motor vehicles, is proposed whose wiper arm is adjustable in its effective length whereby according to the present invention the wiper arm is supported displaceable in the direction of its longitudinal axis within a guide part adapted to be set into to and fro pivot movement by a wiper motor, whereby the guide part is pivotally connected with the vehicle and is arranged coaxially to a toothed segment rigidly connected at the vehicle, and whereby two levers are provided pivotally connected with each other with the free end of one lever pivotally secured at the wiper arm and the free end of the other lever pivotally secured at the guide member, while a pinion meshing with the toothed segment is non-rotatably secured at the free end of the other lever.

Accordingly, it is an object of the present invention to provide a windshield wiper installation for vehicles, especially for motor vehicles which avoids by simple means the aforementioned shortcomings and drawbacks encountered in the prior art.

Another object of the present invention resides in a windshield wiper installation for vehicles which offers optimum visibility conditions to the driver.

A further object of the present invention resides in a windshield wiper installation which not only offers most favorable visibility conditions to the driver but is simple in construction and reliable in operation.

Still a further object of the present invention resides in a windshield wiper installation for motor vehicles which eliminates susceptibility to failures and troubles.

These and other objects, features and advantages of the present invention will become more apparent from the following description when taken in connection with the accompanying drawing which shows, for purposes of illustration only, one embodiment in accordance with the present invention, and wherein:

FIG. 1 is an elevational view of a windshield of a motor vehicle equipped with a windshield wiper installation according to the present invention;

FIG. 2 is an elevational view, on an enlarged scale, of the drive linkage of the windshield wiper installation according to FIG. 1; and FIG. 3 is a plan view on the linkage of FIG. 2.

Referring now to the drawing wherein like reference numerals are used throughout the various views to designate like parts, the wiper blade 1 is detachably connected with the wiper arm 2 in a customary manner, for example, by plug-in connection of conventional type. The wiper arm 2 is displaceable in the direction of its longitudinal axis within a guide means 4 arranged in a guide member 3. The guide member 3 is rotatably supported at the vehicle body or at a similar relatively fixed vehicle part about a pivot pin 5 whereas a toothed segment 6 arranged coaxially thereto is non-rotatably secured at the vehicle.

The displacement of the wiper arm 2 in the guide means 4 takes place as follows:

A linkage (not shown) now shown leading to a conventional wiper motor (not shown) engages at a ball head 7, which imparts a to and fro pivot movement to the guide member 3 about the pivot pin 5. For purposes of the introduction of the displacement movement into the wiper arm 2, two levers 8 and 9 are provided which are pivotally connected with each other whereby the free end of the lever 8 is pivotally connected at the wiper arm 2 and the free end of the other lever 9 is pivotally connected at the guide member 3.

A pinion 10 is non-rotatably secured at the end of the lever 9 which itself is pivotally connected at the guide member 3; the pinion 10 meshes with the toothed segment 6. As a result of this lever connection, a stroke movement is transmitted to the wiper arm 2 and therewith to the wiper blade 1 during the to and fro pivot movement of the guide member 3 which results in the wiper field illustrated in FIG. 1 of the drawing. Of course, in case of two or more wiper arms per windshield, as known in the art, each wiper arm actuating mechanism may be constructed in accordance with the present invention. However, the large wiped area which can be realized by the present invention makes the same particularly suitable as single-blade or single-arm system arranged centrally of the windshield as shown in FIG. 1.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A windshield wiper installation for vehicles which comprises a wiper arm means adjustable in its effective length, characterized by guide means pivotally supported at a relatively fixed vehicle part about a pivot axis and adapted to be set into to and fro pivot movement, said wiper arm means being displaceably supported in said guide means in the direction of the longitudinal axis of said wiper arm means, means for imparting to said wiper arm means a predetermined displacement movement in said longitudinal direction including two lever means pivotally connected with each other, the free end of one lever means being connected with the wiper arm means, and the free end of the other lever means being pivotally connected at the guide means, and further means operative between the free end of said other lever means and said relatively fixed part for causing said predetermined displacement movement during the to and fro pivot movement of said guide means.

2. A windshield wiper installation according to claim 1, characterized in that said further means includes a toothed segment rigidly secured at the vehicle with which meshes a pinion rigidly secured near the free end of the other lever means.

3. A windshield wiper installation according to claim 2, characterized in that said toothed segment is substantially coaxial with the pivot axis of the guide means.

4. A windshield wiper installation according to claim 3, characterized in that said one lever means is longer than the other lever means.

5. A windshield wiper installation according to claim 1, characterized in that said one lever means is longer than the other lever means.

* * * * *